F. C. SCHMITZ.
PROCESS OF OXIDIZING GASES.
APPLICATION FILED JAN. 22, 1914.

1,242,987.

Patented Oct. 16, 1917.

Witnesses:
A. R. Appleman
W. H. Hawkins.

Inventor
FRANK C. SCHMITZ
By his Attorneys
Meyers, Cushman & Rea

UNITED STATES PATENT OFFICE.

FRANK C. SCHMITZ, OF NEW YORK, N. Y.

PROCESS OF OXIDIZING GASES.

1,242,987.  Specification of Letters Patent.  Patented Oct. 16, 1917.

Application filed January 22, 1914. Serial No. 813,701.

*To all whom it may concern:*

Be it known that I, FRANK C. SCHMITZ, a citizen of the United States, residing at New York, in the county of New York and State of New York, have invented new and useful Improvements in Processes of Oxidizing Gases, of which the following is a specification.

My present invention, broadly considered, relates to an improved process of oxidizing certain gases, such for instance as phosphorus, in the production of phosphorus pentoxid, oxidation of the gases being accomplished by thoroughly intermixing with the phosphorus or other gases to be oxidized, oxygen either in its pure form; oxygen mechanically mixed with other gases, as nitrogen, in the form of air; or oxygen bearing chemical combinations suitable for the purpose.

My improved process together with the apparatus by which the process is carried out, one type of which apparatus is herein shown and described, has proved to be especially and peculiarly efficient as a step in the process of manufacturing phosphoric acid from phosphatic material in an electric furnace, and I have therefore, elected to show and describe the process and apparatus in this connection, although I do not wish to be understood as specifically limiting the invention to this particular manufacture as I am aware that it is equally valuable in treating others than phosphorus gases.

Briefly and generally stated the invention, so far as the process is concerned, consists in subjecting a current of the gases to be oxidized to the action or actions of a current or currents flowing in an opposing direction of oxygen either in its pure form; in the form of atmospheric air, or in the form of oxygen-bearing chemical combinations suitable for the purpose. The opposing current preferably moves in a directly opposite direction to that of the gases. The said gases are preferably subjected to successive opposing currents while passing through a plurality of chambers connected one with the other through the medium of restricted passages or orifices, the said chambers preferably being arranged so that the gases are caused to travel in a tortuous path, (although this arrangement is not absolutely necessary) and the opposing currents act upon the gases as they travel through the restricted passage or passages. These successive actions of the opposing currents serve to thoroughly intermix the gases and oxygen so that complete oxidation results before the gases pass out of the chamber on to the concentration and absorption system or apparatus, as for example in the manufacture of phosphoric acid.

In order to enable others to understand and practice my said improved process, I have shown and will describe the same associated with a plant for the manufacture of phosphoric acid, the said process constituting a distinctly novel step in such manufacture.

In the accompanying drawing.

Figures 1, 2:
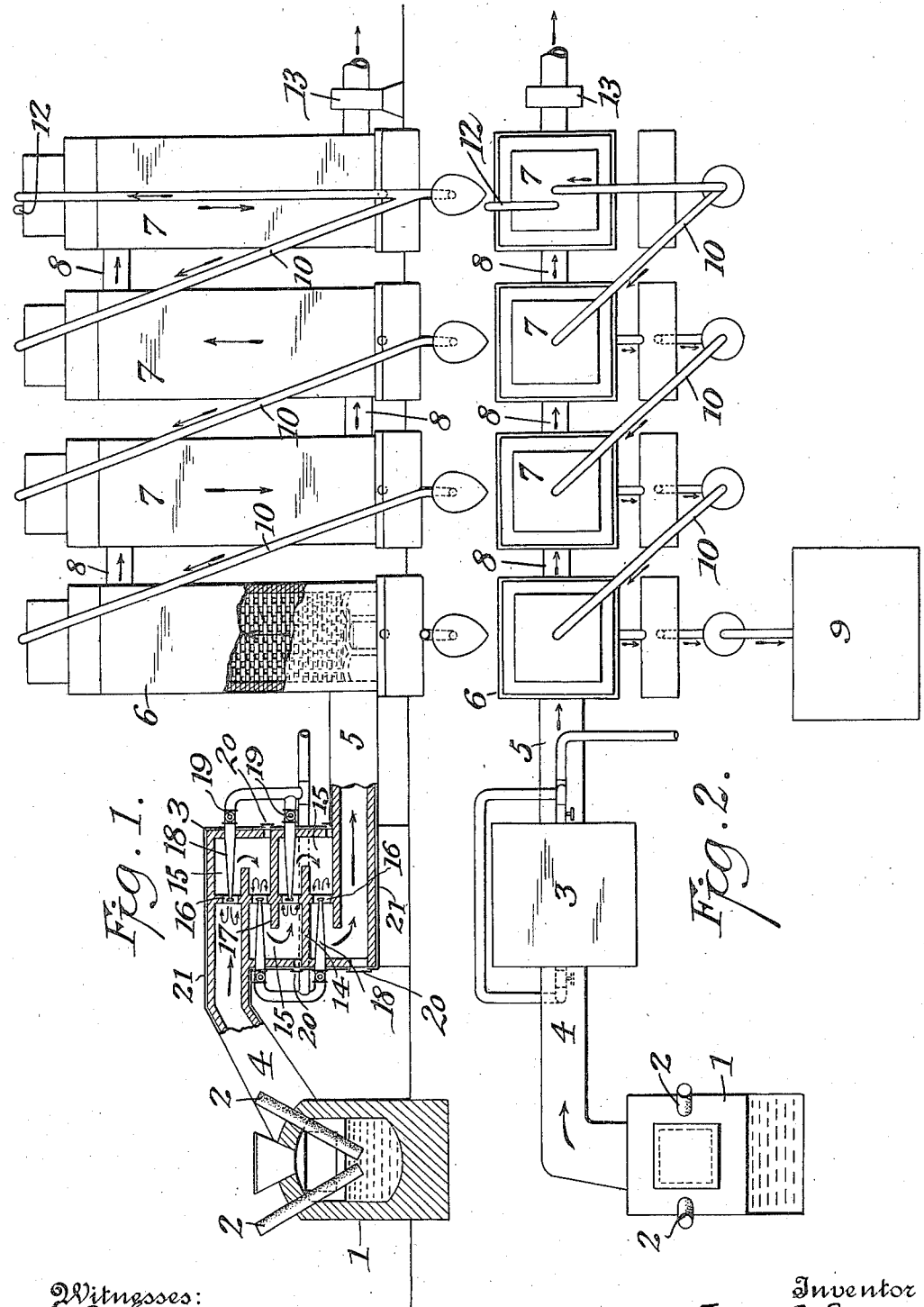
Figure 1 is a front elevation partly in section showing the essentials of a phosphoric acid plant, the several apparatus constituting such a plant being illustrated somewhat conventionally, and embodied in the plant is shown one form of oxidizing chamber constructed for carrying out my improved process, this showing however is only illustrative, and is not to be considered as restrictive.
Fig. 2 is a top plan view of the plant shown in Fig. 1.

In the said drawing the reference numeral 1 designates an electric furnace of any approved construction through the top wall of which the carbon or other electrodes 2, project or extend into the furnace chamber wherein the phosphatic material, such as phosphate rock, silica and carbon is placed. The reference numeral 3 designates the oxidizing chamber presently to be described in detail into which chamber the gases to be oxidized pass from the furnace through the connecting flue 4. From the oxidizing chamber 3, the oxidized gases pass by means of the flue 5, into the concentrating tower 6, of any approved construction such for instance as a Glover tower, and from thence they pass into the absorption tower or towers 7, through suitable connecting flues 8. There may be one, two or more absorption towers as may be desired to suit the conditions of manufacture, the gases passing successively through the several absorption towers.

The gases pass from the oxidizing chamber 3 into the concentrating tower 6, at a temperature of about 2300° F., and are here acted upon by a spray or shower dilute of phosphoric acid pumped from the next succeeding or first absorption tower which concentrates the said acid to about a 50% strength, the said acid leaving the bottom of the tower and passing into a suitable storage tank or receptacle 9, Fig. 2.

The weaker gases leaving the concentrating tower 6, pass successively into the several absorption towers 7, in each of which they are acted upon by a spray of dilute phosphoric acid collected at the bottom of each of said towers, the collected acid from one tower being pumped through pipes 10, into the tower ahead so that the gases in each successive tower are sprayed with acids of different strength, the stronger acid from the first tower of the system being pumped directly into the concentrating tower 6, and the weaker acid from the last tower being pumped into the next to the last tower. Usually water is sprayed through a pipe 12, into the last tower of the system, when the operation is started, but after the operation has been carried on for a sufficient length of time, the weak acid from the last or from any other of the towers may be sprayed into the last tower. I prefer to connect a suction fan 13, to the last tower to assist in drawing the gases through the several towers.

It is a well known fact that when a suitable mixture of phosphate rock, silica, and carbon is introduced into a properly constructed air tight electric furnace, and an alternating current of electricity is discharged through the mass, phosphorus together with other products in gaseous form pass out of the furnace and may be collected in proper apparatus, calcium silicate remaining in the furnace as slag.

The formula for the principal part of the reaction taking place in the furnace is as follows:

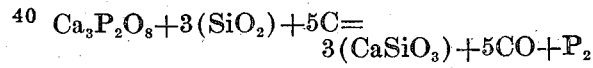
$$Ca_3P_2O_8 + 3(SiO_2) + 5C = 3(CaSiO_3) + 5CO + P_2$$

The gaseous products of this reaction are carried from the reaction zone of the furnace to a retort or chamber into which oxygen is admitted, and there oxidized into carbon dioxid ($CO_2$) and phosphorus pentoxid ($P_2O_5$), according to the formulæ

$$CO + O = CO_2$$
$$P_2 + O_5 = P_2O_5$$

While it is probably true that some carbon dioxid ($CO_2$) is produced in the furnace and some oxidized phosphorus is also produced, the latter in one or more forms, the reaction in the main is as above described. The formation of phosphorus pentoxid in the electric furnace itself is not commercially practicable because of the destructive action of oxygen on the electrodes, and because of the difficulty in obtaining a perfect union or mixture between the phosphorus and the oxygen under furnace conditions.

The oxidizing chamber may be constructed as a part of the furnace, as in the form of a stack, shaft, or flue, through which the ore is or is not fed into the reaction zone, or it may preferably be a separate chamber of suitable design connected to the furnace, where oxygen in proper amount may be intimately mingled with the gaseous products of the furnace reaction to insure the above mentioned oxidizing reactions.

In the present embodiment of the invention I have shown the oxidizing chamber as consisting of a relatively large chamber 3, divided by means of suitably arranged partitions 14, into a plurality of sub-chambers 15, communicating one with the other by means of constricted openings 16, formed in the said partitions 14, the said sub-chambers preferably being further provided with longitudinally extending baffle-walls 17. The sub-chambers with their baffle-walls are so arranged that the gases being oxidized are caused to travel in a tortuous path as indicated by the arrows in Fig. 1.

The means for subjecting the gases to the action of opposing currents of oxygen or oxygen-bearing chemical combinations, consists of a series of spray nozzles 18, or other devices so arranged as to direct the oxygen to flow under pressure in opposition to the flow of the gases to be oxidized, and by preference I locate the said nozzles on the center line of the constricted openings 16, or at the point or points where the gases flow from one sub-chamber to the other thus insuring a thorough mixture of the gases and oxygen. The combined gases flow from one sub-chamber to another and in their tortuous passage are subjected to successive opposing currents of oxygen. The gases are permitted to successively expand during oxidation as they pass through the several sub-chambers, and these successive expansions taken in connection with the successive actions of the opposing currents serve to thoroughly break up and intermix the gases and oxygen and thus bring about complete oxidation.

The supply of oxygen passing through the several nozzles 18, may be regulated by suitable valves 19, to suit the conditions of operation.

The oxidizing chamber 3, including the several sub-chambers thereof is provided at appropriate places with suitable man-holes 20, for the removal of any precipitates, dust, dirt, etc., that may either be carried into the chamber with the gases and deposited or that may be produced in the chamber by precipitation due to chemical action, also for purposes of examination of the interior of the chamber.

Obviously the entire interior of the chamber as well as its equipment should be made of materials resistant to the actions taking place therein, such materials depending upon the operations carried on within the chamber. Also the chamber should be incased in as nearly an air-tight cover as possible; for example, a riveted steel shell 21, through which the oxygen pipes pass in an air-tight joint.

Briefly stated the oxidizing apparatus consists preferably of a large chamber in which there are a series of orifices with means for feeding the oxygen thereinto in a direction opposite to the flow of the gases to be oxidized, and sub-chambers of larger cross-sectional area, arranged alternately and in sufficient number to produce complete oxidization of the gases admitted for the purpose, and complete combustion of the admitted oxygen.

In the foregoing specification and in the appended claims the term "oxygen" is employed in the broad meaning of the word and includes oxygen in its pure form; oxygen mechanically mixed with other gases, as nitrogen in the form of air, or oxygen bearing chemical combinations suitable for the purpose.

While I have referred specifically to oxidizing phosphorus my improved process is equally adapted to the oxidization of other gases, such for instance as carbon monoxid; phosphorus oxid, sulfur dioxid and others.

What I claim is:—

1. The process herein described of oxidizing gases, which consists in causing the gases to flow through a chamber and subjecting such gases while in the chamber to an opposed current of oxygen flowing in a direction opposed to the direction of flow of the gases.

2. The process herein described of oxidizing gases, which consists in causing the gases to pass through a chamber and subjecting such flowing gases to the action of successive opposed currents of oxygen opposing the movement of the gases.

3. The process herein described of oxidizing gases, which consists in passing the gases through a chamber in a tortuous path and subjecting the gases to the action of opposed currents of oxygen opposing the movement of the gases.

4. The process herein described of oxidizing gases, which consists in causing the gases to flow in a tortuous path and subjecting the said flowing gases to successive opposing currents of oxygen.

5. The process herein described of oxidizing gases, which consists in causing the said gases to flow in one direction and subjecting such flowing gases to the action of an opposed current of oxygen.

6. The process herein described of oxidizing gases, which consists in allowing said gases to successively expand and subjecting the gases to the successive action of opposed currents of oxygen.

7. As a step in the art of making phosphoric acid, the process herein described of subjecting phosphorus gases to the action of an opposing current of oxygen.

8. As a step in the art of making phosphoric acid, the process herein described of causing phosphorus gases to flow in one direction and subjecting said gases to the action of successive opposing currents of oxygen.

9. As a step in the art of making phosphoric acid, the process herein described of causing phosphorus gases to flow in a tortuous path and subjecting said gases to the successive action of opposing currents of oxygen.

10. As a step in the art of making phosphoric acid, the method herein described which consists in causing such gases to successively expand in separate chambers and subjecting the gases successively to the action of opposing currents of oxygen.

11. The herein described process of producing phosphoric acid, which consists in rendering a mixture of phosphate rock, silica and carbon, fluid by subjecting such mixture to high heat to drive off phosphorus in the form of gases, subjecting such gases to the action of an opposing current of oxygen caused to flow in opposition to the path of flow of the gases to produce phosphorus pentoxid, and finally subjecting such pentoxid to the action of a weak solution of phosphoric acid to produce a higher concentration of said acid.

12. The herein described process of producing phosphoric acid, which consists in rendering a mixture of phosphate rock, silica and carbon, fluid by subjecting the mixture to high heat to drive off phosphorus in the form of gases, causing said gases to travel in a tortuous path, subjecting the moving gases to the action of successive currents of oxygen caused to flow in opposition to the path of travel of the gases to produce phosphorus pentoxid, and finally spraying such pentoxid with a weak solution of phosphoric acid to produce a higher concentration of said acid.

13. The process of oxidizing a flowing stream of gas or vapor which comprises injecting a current of oxygen in said stream in a direction counter to the flow thereof.

14. The process of oxidizing a flowing stream of gas or vapor which comprises producing a swirling current of oxygen in said stream.

15. The process of oxidizing a flowing stream of gas or vapor which comprises distributing oxygen in a fine stream in said flowing stream in a different direction to that of the said flowing stream.

16. The herein described process of oxidizing phosphorus vapor which comprises producing a counter-current of oxygen in a moving stream of phosphorus vapor.

17. The herein described process of oxidizing phosphorus which comprises producing a counter-current of oxygen in a moving stream of phosphorus vapor, and then breaking up the combined stream.

18. The herein described process of oxidizing a gas or vapor which comprises drawing the same downwardly through a chamber and introducing an oxidizing current in the upper part of the chamber.

19. The herein described process for manufacturing phosphoric acid which comprises first heating natural phosphate rock, silicious material and carbon to produce vapors of phosphorus, then withdrawing the furnace gases and vapors in a stream, then breaking up the stream and mixing the gases with oxygen and then absorbing the acid by an aqueous liquid in towers operated on the countercurrent system.

20. The herein described process of manufacturing phosphoric acid which comprises first heating natural phosphate rock, silicious material and carbon to produce vapors of phosphorus, withdrawing the furnace gases and vapors in a stream, breaking up the stream with a countercurrent of oxygen and then absorbing the phosphoric acid.

21. The herein described method of manufacturing phosphoric acid which comprises heating natural phosphate rock, silicious material and carbon to produce vapors of phosphorus, withdrawing the gases and vapors in a stream and mixing the gases with oxygen, then breaking up the combined stream of gases and oxygen and then absorbing the phosphoric acid.

22. The herein described method of manufacturing phosphoric acid which comprises heating natural phosphate rock, silicious material and carbon to produce vapors of phosphorus, withdrawing the gases and vapors in a stream and mixing the gases with oxygen, then breaking up the combined stream of gases and oxygen and then absorbing the phosphoric acid in absorption towers operated on the countercurrent principle.

23. The process herein described of oxidizing gases, which consists in subjecting the flowing gases to a counter-current of oxygen.

24. The process herein described of oxidizing gases, which consists in passing the gases through a chamber and subjecting such gases while in the chamber to a counter-current of oxygen.

25. As a step in the art of making phosphoric acid, the process herein described of subjecting phosphorus gases to the action of a counter-current of oxygen.

In testimony whereof I have hereunto set my hand in presence of two subscribing witnesses.

FRANK C. SCHMITZ.

Witnesses:
J. GRANVILLE MEYERS,
E. H. BICKERTON.